April 16, 1935. M. F. H. GOUVERNEUR 1,998,406
INSULATOR SUSPENSION HARDWARE
Filed June 10, 1932   3 Sheets-Sheet 1
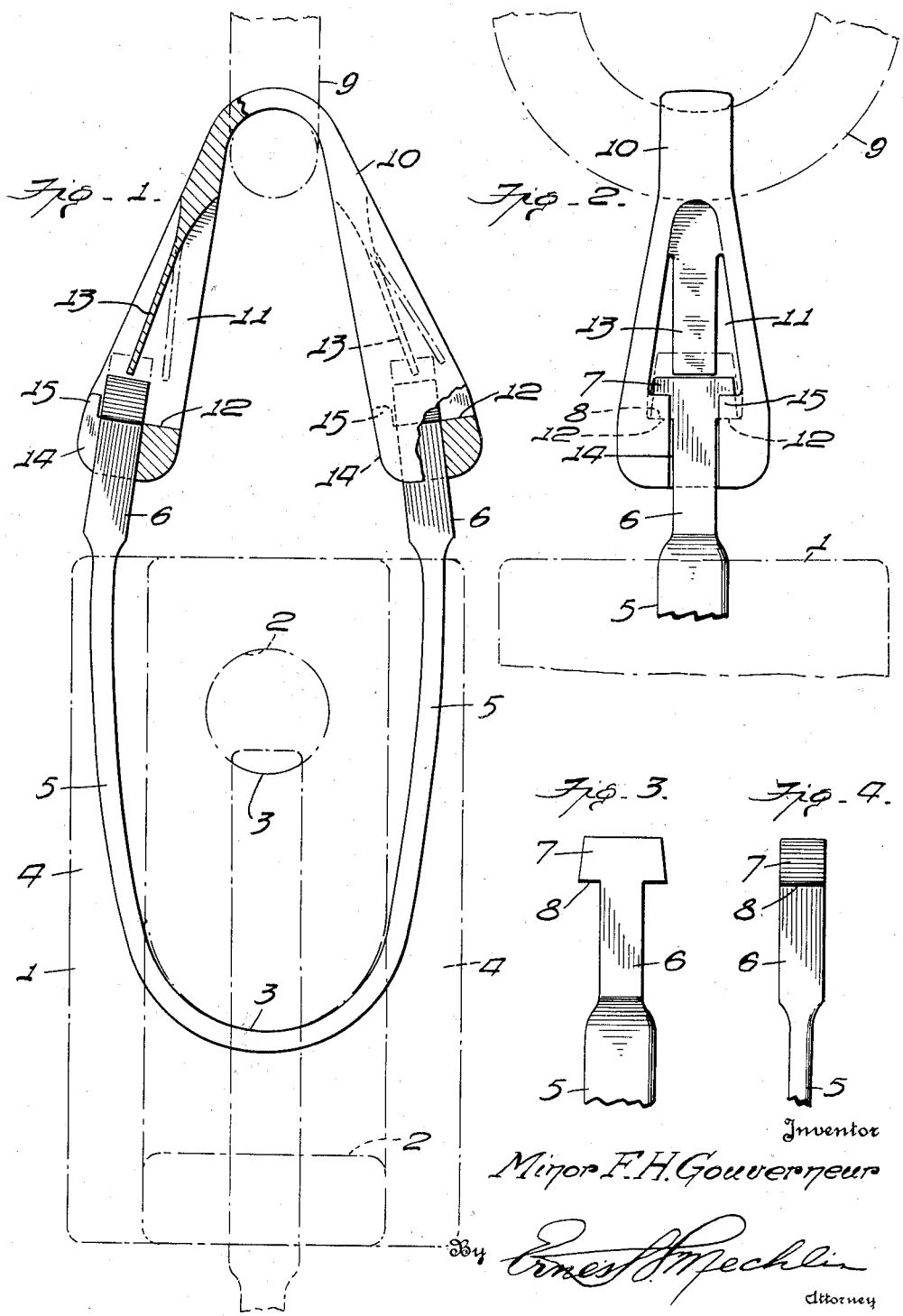

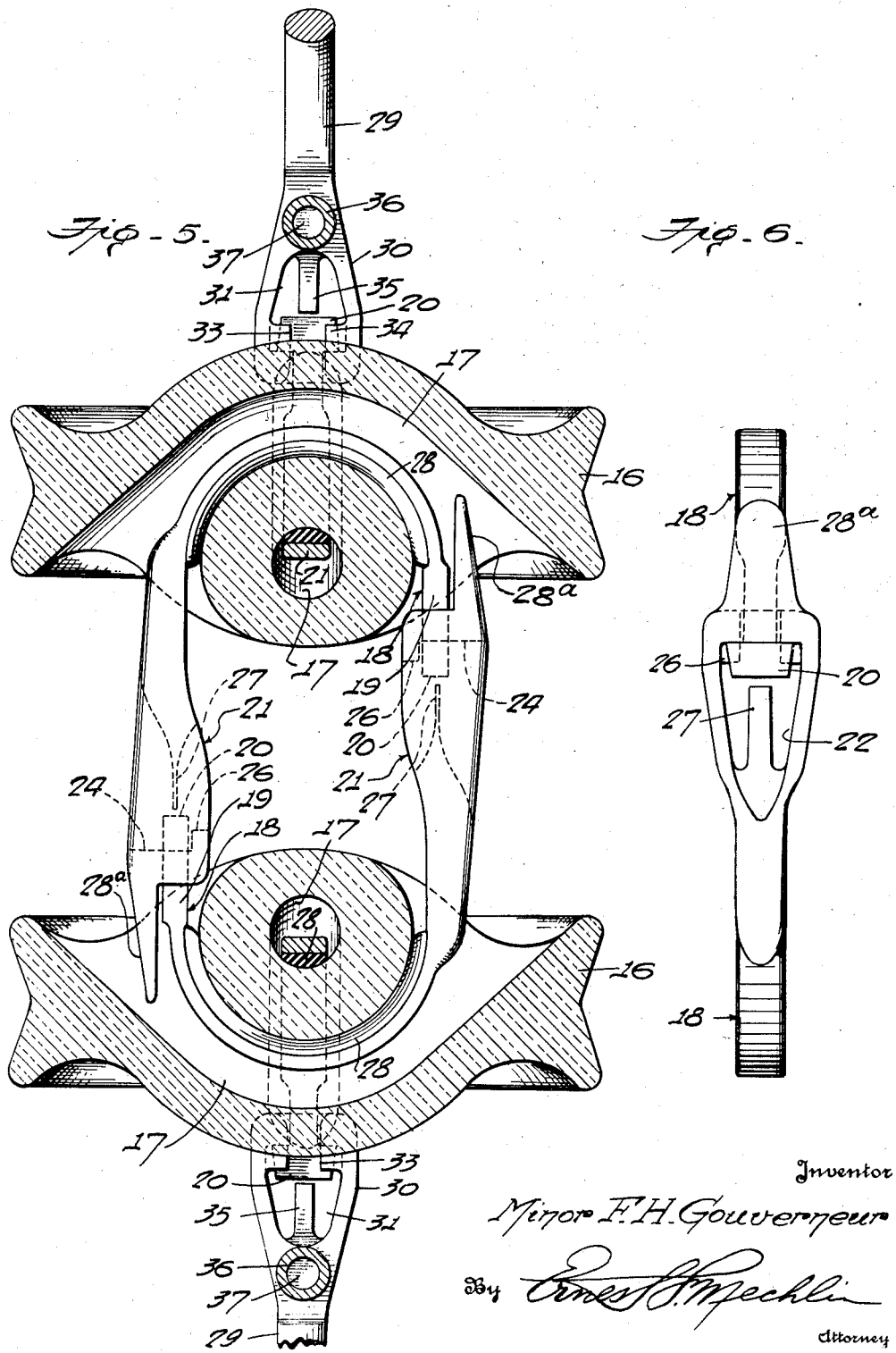

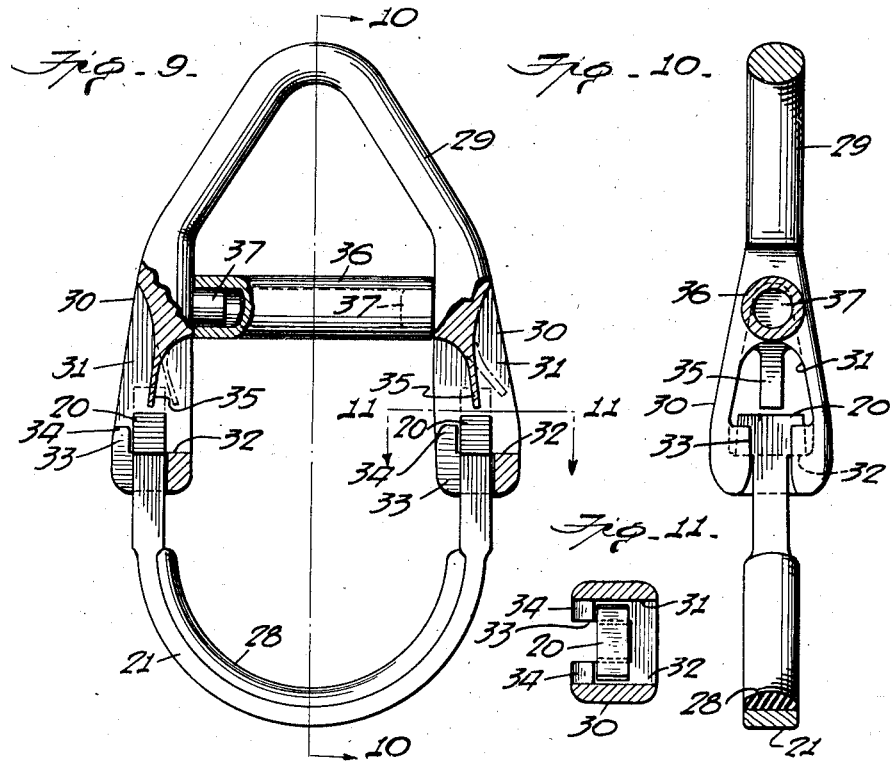
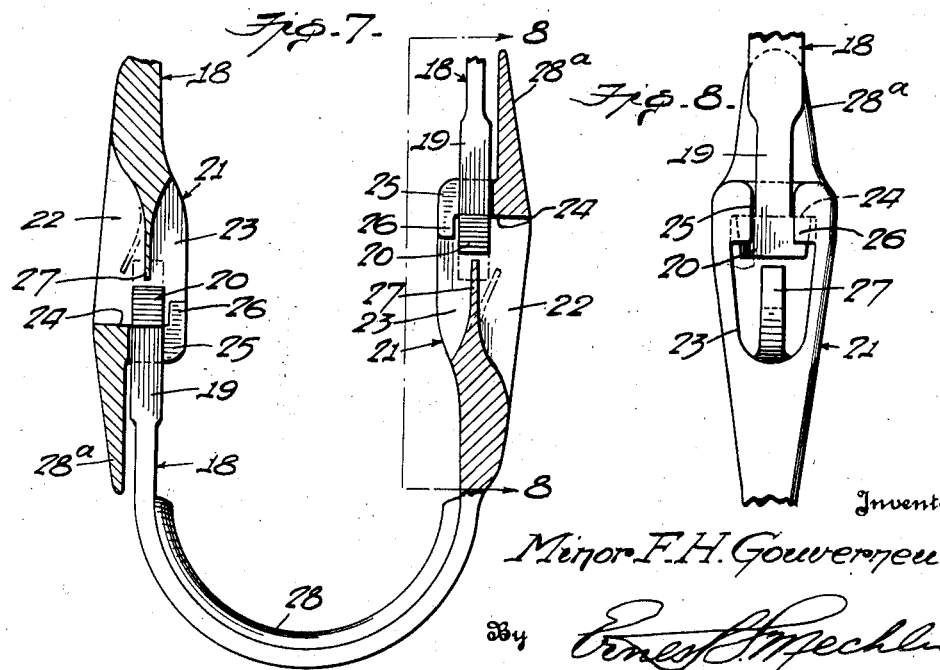

Patented Apr. 16, 1935

1,998,406

UNITED STATES PATENT OFFICE 1,998,406

INSULATOR SUSPENSION HARDWARE

Minor F. H. Gouverneur, Baltimore, Md., assignor to Locke Insulator Corporation, Baltimore, Md., a corporation of Maryland Application June 10, 1932, Serial No. 616,531

5 Claims. (Cl. 173—366)

The invention relates to suspension means for suspending or connecting insulators of the strain type, that is to say the variety in which the insulator unit is formed with interlinking curved passages or transversely arranged passages having at least one curved wall.

The principal object of the invention, generally stated, is to provide a suspension or connecting means embodying yoke-like or link-like elements having means thereon for preventing separation after connection, thereby precluding accidental detachment when in service.

An important object of the invention is to provide suspension or connecting means which may consist of counterpart members though there is no restriction in this respect as the engaging members may be of quite different construction it being a feature of the invention that the various modifications and embodiments thereof have a common construction as regards the means for preventing disconnection of the parts after assembly has been effected.

A further object of the invention is to provide suspension or connecting means in the nature of links or yokes or a combination of both adapted to be used in association with insulators of the Hewlett type for connecting them in a chain or string, for suspending a chain or string or for connecting or for suspending units of the guy strain type, these and other possible variations and adaptations coming within the purview of the invention.

Yet another object is to provide suspension and connecting means which may be assembled without the employment of any extraneous or auxiliary fastening devices and in which assembly is maintained by distortable elements forming an integral part of one or both of the co-acting link or yoke members.

It is a still further object to provide brace means forming part of a suspension yoke and operable to prevent distortion of the sides thereof under strain.

An additional object is to provide an arrangement and structure of this character which will be simple and inexpensive to make, easy to install, or assemble as the case may be, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view partly in elevation and partly in section illustrating a form of the invention particularly adapted for use in connection with insulators of the guy strain type, Figure 2 is a fragmentary side elevation of what is shown in Figure 1, Figure 3 is a fragmentary detail view of one side of one of the link arms, Figure 4 is an edge elevation thereof, Figure 5 is a vertical cross sectional view through a pair of insulators of the Hewlett type showing them connected by another form of my suspension and connecting means, Figure 6 is a side elevation of a pair of the co-acting links, Figure 7 is a detail view partly in elevation but mostly in section illustrating the same structure disclosed in Figure 5, Figure 8 is a sectional view on the line 8—8 of Figure 7, Figure 9 is a side elevation with parts broken away and in section showing means adapted to be connected with the uppermost unit of a string of Hewlett insulators for suspending the same, Figure 10 is a cross sectional view taken on the line 10—10 of Figure 9, Figure 11 is a detail cross sectional view taken on the line 11—11 of Figure 9.

Referring more particularly to the drawings and especially Figures 1 to 4, the numeral 1 designates an insulator of the guy strain type which being of conventional design is illustrated simply by dot and dash lines in Figures 1 and 2. It is well known that such insulators are formed with transverse openings 2 arranged at right angles and extending through the end portions, the confronting or adjacent surfaces 3 of such openings being curved. At their ends these openings lead to longitudinally extending grooves 4.

The means for suspending such an insulator is here represented as comprising an elongated curved open link 5 provided at its end portions with reduced necks 6 terminating in heads 7 which project beyond the sides of the necks to provide retaining shoulders 8. It is intended that the link 5 be of such shape and the end portions including the heads of such size as to be readily threaded through the lower one of the openings 2, the curved bight portion of the link engaging the curved surface 3 and the link arms lying within the grooves 4 at opposite sides of the insulator. The neck portions 6 and the heads 7 project appreciably above the upper end of the insulator as clearly shown in Figures 1 and 2. It is customary to suspend such insulators for instance from a ring or loop 9, or other equivalent support, and to accomplish this I provide a yoke 10 which is here represented as of substantially inverted V-shape adapted to have its bight portion engage upon the member 9. The end portions of the arms of this yoke are enlarged as compared with the bight portion and formed with openings 11 at the lower ends of which are seats 12 and extending longitudinally of which are tongues 13 which are integral with the body of the yoke but which are greatly reduced in thickness so as to be readily capable of bending. These tongues terminate considerably short of the seats 12, the distance between the ends of the tongues and the seats being slightly more than the height of the heads 7 on the link 5 for a purpose to be explained. The outer side of the end portion of one arm of the yoke and the inner side of the end portion of the other arm is formed with a slot 14 communicating with the opening 11 and of a width slightly greater than that of the neck portion 6 of the link 5. The same outer side of one arm of the yoke and the same inner side of the other is formed with projections 15 extending above the seat 12 which constitute retaining means for the heads 7.

In assembling this structure, the link 5 is threaded through the lower opening 2 in the insulator 1 and is moved about or manipulated to bring it into the position shown in Figure 1. The yoke 10 being inserted through the ring or other support 9 is then engaged with the link 5 by bringing the latter into such position that the arms thereof will be located at the left side of the arms of the yoke 10, viewing Figure 1, with the heads 7 located above the retaining projections 15. Initially the tongues 13 are in the dot and dash line positions shown in Figure 1 so as to be out of the way. The operator then moves the link 5 relatively to the yoke 10 so as to bring the heads 7 into the openings 11, at which time the necks 6 on the link pass into the slots 14. After the shoulders 8 of the heads have cleared the projections 15 the link and yoke are moved relatively apart so that the shoulders 8 will engage upon the seats 12. By means of a screw driver or any other convenient implement, or even special pliers or the like, if necessary, the operator then bends the tongues 13 out of the dot and dash line positions into the positions shown by full lines in Figure 1 so that the free ends of the tongues will overlie the upper ends of the heads 7. Clearly these tongues then serve as stops to prevent the heads 7 from being moved upwardly a sufficient extent to clear the projections 15 and it is therefore obvious that disconnection of the parts cannot occur as long as the tongues 13 are in this restraining position.

There is of course no limitation as to the number of insulators 1 which may be in a string and any desired number of units may be connected by means of the structure above described, it being a simple matter to interlink adjacent yokes or connect them by means of a ring or the like, such possibilities readily suggesting themselves to one skilled in the art.

The same general scheme may be employed for connecting a pair of insulator units 16 of the Hewlett type in which there are provided interlinking curved passages 17. In adapting the invention to this use, I provide a pair of links 18 which may be counterparts and each of which is of curved link form having one end formed with a neck 19 and a laterally widened head 20 similar to the neck 6 and head 7 above described. The other end of each link is considerably enlarged and formed to resemble more or less a housing 21 formed at its outer side with an opening 22 and formed with a recess 23 opening out at its inner side. At the bottom of the recess 23 is a seat 24 and the end portion of the housing is formed with a slot 25 of a width slightly greater than that of the neck 19 so as to receive the same with the head 20 located within the recess 23. The inner face of the end wall of each housing is formed with projections 26 at opposite sides of the slot 25 adapted to serve as retaining means for the head 20. Formed integrally with each link and located within the recess 23 therein is a bendable tongue 27 which is initially in the position shown by dot and dash lines in Figure 7 and which is adapted to be bent by means of a tool inserted through the opening 22 so as to extend into the position shown by full lines in the same figure and in Figure 5.

To connect a pair of the units 16 by means of my device, the two counterpart links 18 are threaded through the curved passages 17 in the insulator units, after which the links are moved relatively to bring the heads 20 adjacent the inner faces of the housings 21 with the heads 20 located inwardly of the projections 26. The links are then moved laterally with respect to each other to pass the necks 19 into the slots 25 and to bring the heads 20 into the recesses 23, after which the links are moved relatively apart to bring the shoulders on the heads into engagement with the seats 24. When this is done the projections 26 overlie the inner faces of the heads. The operator then introduces a screw driver or other appropriate tool through each of the openings 22 and bends each tongue 27 so that it will overlie the end of the adjacent head 20. Clearly the links cannot then be moved relatively to each other a sufficient distance for the heads to pass over and disengage the retaining projections 26 so that accidental detachment of the parts will be prevented, it being necessary to bend the tongues back to their original positions before the links can be disengaged.

In the construction of the links such as those illustrated at 18 it is frequently customary to provide the bight portion with a liner 28 of yieldable material, for instance lead or some soft alloy, the idea being that such material may "flow" and accommodate itself to inequalities in the engaging surface of the passage 17 and thereby avoid concentration of mechanical strains or pressure at any high spots which may exist in the curved surface. It will be clear that any desired number of Hewlett units 16 may be connected in a series, string or chain by means of these interengaging counterpart links.

In actual practice it has been found that in the event of a flash-over on a line there is a tendency for the arc to hug the surfaces of the insulator units and to strike at the links where they are exposed between successive units. In some instances this results in burning away of the metal of the links to such an extent as to reduce their mechanical strength below that necessary for safety. To remedy this I have found it a convenient expedient to form the junctures of the housings with the links rather thick and to form the outer or free ends of the housing or enlarged portions 21 of the links with elongated projections 28ᵃ which, when the links are assembled, will overlie the relatively narrow portions thereof, the ends of the projections entering the ends of the curved passages 17 in the insulator units. When such projections are provided it is clear that they will serve to protect the links from being burned away as they themselves will receive the arc which they are well capable of withstanding on account of their relative thickness as compared with the cross sectional size of the links themselves. The increased thickness at the other ends of the housing portions will enable them to stand a partial burning.

For suspending a string of Hewlett insulators connected in this manner use may of course be made of the simple yoke 10 illustrated in Figures 1 and 2 though it is probably preferable to make use of the yoke shown in detail in Figures 9 to 11 wherein there is disclosed a yoke 29 having its major portion of substantially inverted V-shape adapted to be suspended by a ring or other equivalent support. From intermediate points the arms of this yoke are preferably extended in parallel relation and are enlarged and formed somewhat in the nature of housings 30 corresponding to the housings illustrated at 21 in Figures 5 to 8, these housings portions being formed with openings 31 extending clear through and which define seats 32 for the heads 20 on the ends of a curved link 21 adapted to be threaded through the lower passage in the uppermost unit in a string. The outer face of one housing and the inner face of the other is formed with a slot 33 above and at opposite sides of which are projections 34 constituting retaining means for the heads. Projecting into the opening 31 in each housing member is a bendable tongue 35 initially in the dot and dash line position shown in Figure 9 and adapted to be bent into overlying or obstructing relation to the adjacent head when the link 21 is associated and connected with the yoke 29 in the same manner as the links 18 are connected or in the same manner as the link 5 is connected with the yoke 10 in the first form of the invention.

On account of the great weight of a string of such insulators I have found it advisable to brace the yoke 29 against collapsing and this is done easily by providing a tubular strut 36 bridging the space between the parallel portions of the arms of the yoke, this strut being held in place by engagement of its ends upon projections or tits 37 on the confronting faces of the link arms.

The links 5, 18 and 21 are intended to be forgings and capable of being bent so that they may be initially of such openness or curvature as to permit threading through the passages. After insertion the openness may be reduced—that is to say the curvature may be made more abrupt, by some suitable means or operation, so that the links may be properly connected. When subjected to the severe strains of service the links will conform their curvature to the requirements.

Regardless of the type of insulators supported or connected and regardless of the exact specific construction of the links or yokes employed it will be seen that in each and every form of the invention there is provided the bendable tongue which is normally out of obstructing relation to the heads on the yokes or links so that they may be readily engaged without it being necessary to use any tools and so after such engagement a mere simple bending of the tongues to overlie or obstruct the heads on the links or yokes separation of the parts is positively prevented. It will be observed that there are no complicated working elements to be handled and that the work of installation will consequently be greatly facilitated. It is believed that from the foregoing the construction, operation and advantages will be readily apparent to one skilled in the art without further explanation.

While I have shown and described the preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Suspension means for an insulator having a passage therethrough, comprising a pair of link-like members, one adapted to extend through said passage, said members being formed on their respective arms with laterally overhanging heads and widened portions formed with openings extending entirely therethrough defining seats for the heads, said widened portions having slots at the seats and projections at opposite sides of the slot constituting retaining means for the heads, said link-like members being connectible with each other by relative lateral movement, and tongues projecting into the respective openings in normally non-obstructing relation to the heads and bendable to overlie the same for preventing separation of the links.

2. Suspension means for an insulator of the type having a passage therethrough, comprising coacting link members one of which is adapted to extend through the passage in the insulator, the respective ends of the link members being formed with constricted necks terminating in heads overhanging the side edges thereof and with enlarged portions formed with openings extending entirely therethrough defining seats, the ends of said enlarged portions having slots opening out to the corresponding sides and leading to the seats and adapted to receive said constricted necks when the link members are brought together by relative lateral movement, said enlarged portions further having projections at opposite sides of the slots and projecting beyond the seats to constitute retaining means for the heads to prevent withdrawal of the necks laterally through the slots, the outer and inner sides of the ends of the links being recessed to define narrow tongues integral with the enlarged portions and bendable to extend in obstructing relation to the heads for preventing relative longitudinal movement of the links.

3. Means for supporting an insulator of the type having a passage therethrough, comprising a pair of curved links one of which is adapted to extend through said passage, said links having certain of their ends provided with heads projecting beyond the side edges and having their other ends formed with enlarged portions having openings extending entirely therethrough and formed with seats for the heads and further formed with slots, the slots opening out at the outer side of one enlarged portion and at the inner side of the other, said slots receiving the portions adjacent the heads of the confronting links, projections at opposite sides of the slots and rising from the seats cooperating with the heads for preventing relative lateral displacement of the links when the heads are engaged upon the seats, and means integral with said enlarged portions bendable to overlie and obstruct the heads in endwise abutting relation thereto for preventing relative longitudinal displacement of the links.

4. A two-part link member for insulator chains comprising a pair of members of substantially U-shape having arms, certain of said arms terminating in heads and the others having their end portions enlarged and each formed with a recess and with a slot in one side communicating with the recess, projections extending into the recess at the entrance end of the slot, said slot being adapted to allow the arm and head of the other member to pass therethrough to seat said head within the recess whereby said projections will operate to prevent relative lateral displacement of the members, the outer and inner sides of each enlarged portion being reduced to define an integral tongue projecting into the recess in normally non-obstructing relation to the head therein and bendable to overlie the head in endwise abutting relation thereto for preventing relative longitudinal movement of the members.

5. A two-part suspension means for insulator chains, comprising a pair of links one of which is adapted to extend through a passage in an insulator, the other link including spaced arms formed on their confronting sides with projections, and a tubular strut engaged upon said projections and bridging the space between the arms for preventing relative movement thereof toward each other.

MINOR F. H. GOUVERNEUR.